INVENTOR.
W. B. REYNOLDS

2,899,418

POLYMERIZATION OF OLEFINS BY MECHANICAL ACTIVATION PROCESS

William B. Reynolds, Bartlesville, Okla., assignor to Phillips Petroleum Company, a corporation of Delaware Application November 21, 1955, Serial No. 547,962

13 Claims. (Cl. 260—94.9)

This invention relates to the polymerization of olefins. In one aspect, this invention relates to an improved process for the polymerization of olefins.

A variety of reactions and processes for the polymerization of olefins is known in the art. One type of polymerization system for olefins, which has been taught recently by the prior art employs a metal and a halide of titanium, vanadium or zirconium. In addition, in some systems, an organic halide is used with said metal and said metal halide.

I have invented an improvement of this and related processes wherein improved reaction rates are obtained and increased amounts of polymer are obtained per unit of catalyst. The method is broadly applicable to monoolefins containing from 2 to 8 carbon atoms per molecule and to diolefins containing the same number of carbon atoms and to other monomers.

I refer to this process as a mechanical activation process and it involves a special means whereby the metal in the catalyst system is constantly supplied in a finely divided form with fresh surfaces of the metal being continuously exposed. This method is particularly applicable to catalyst systems utilizing aluminum and/or magnesium as the metal wherein the reaction is carried out in the presence of a halide of titanium, vanadium or zirconium. An organic chloride, bromide, fluoride, or iodide containing one or more halogen atoms per molecule can be included in this catalyst system, if desired, the reaction product of the halide and the metal catalyzing the polymerization. The reaction is generally carried out in the presence of an inert diluent, preferably an aliphatic or aromatic hydrocarbon.

The following are objects of this invention.

An object of this invention is to provide an improved olefin polymerization process. A further object of this invention is to provide an olefin polymerization process whereby increased yields of polymers are obtained per unit of catalyst. A further object of this invention is to provide a more active catalyst for the polymerization of olefins.

Figure 1:
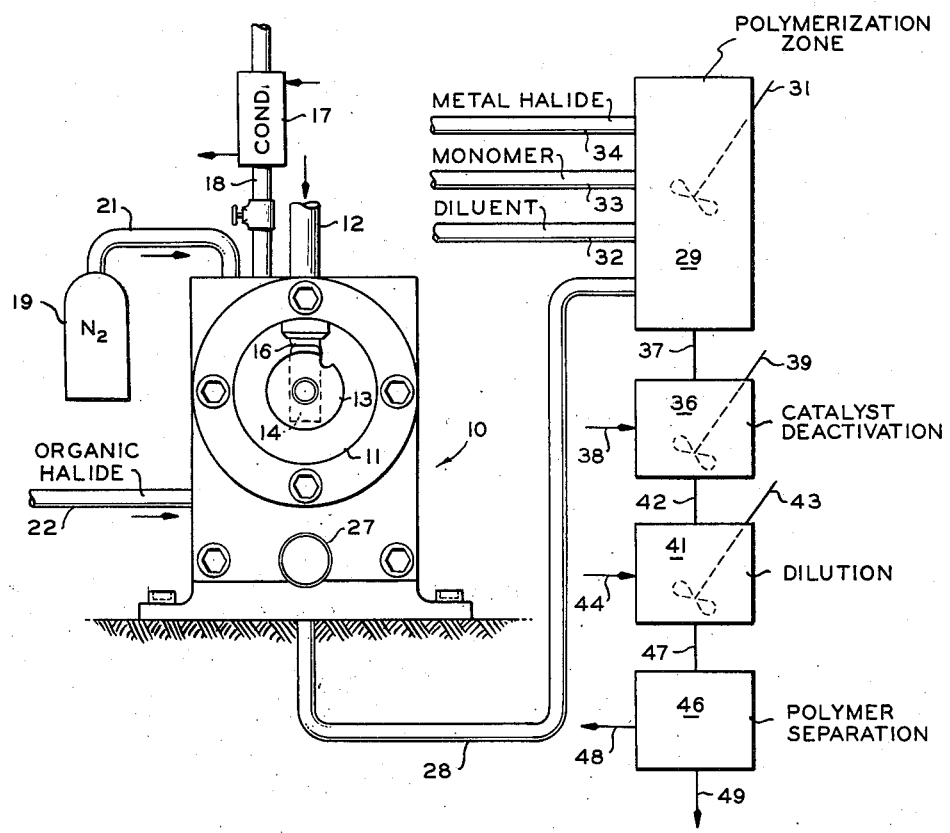
Figure 2:
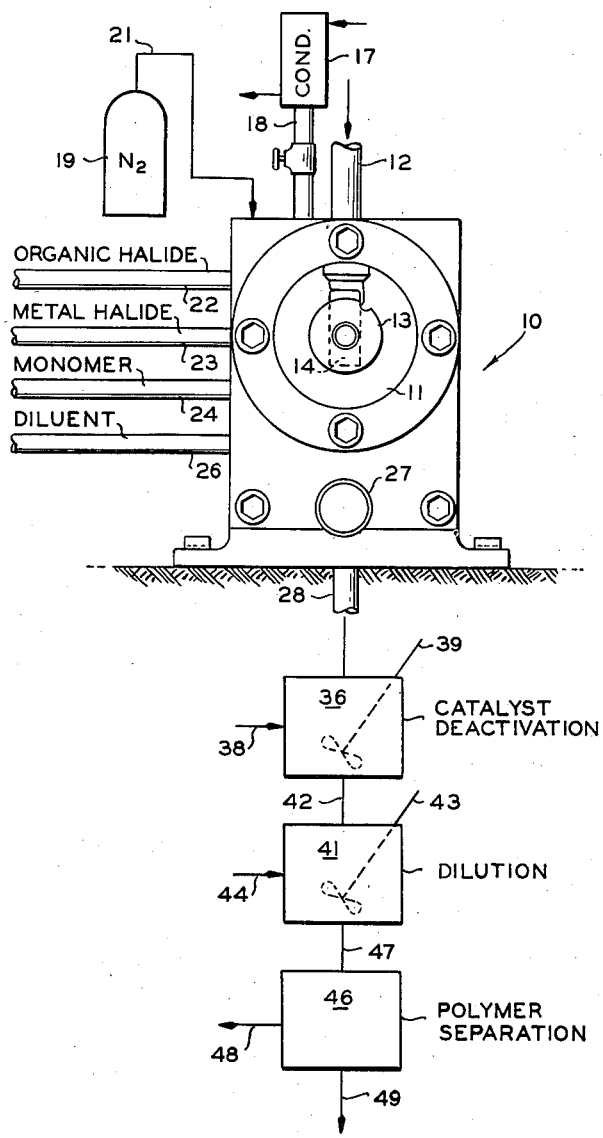

Other objects and advantages of this invention will be apparent to one skilled in the art upon reading this disclosure and studying the accompanying drawing, which comprises Figure 1, a diagrammatic showing of a flow sheet of one form of my invention, and Figure 2, a diagrammatic flow sheet showing a modification of my invention.

According to my invention, the polymerization is improved by supplying the metal to the reaction zone in a finely divided form with fresh surfaces of the metal being exposed. Preferably, this metal is supplied continuously. This method involves the use of a special apparatus in which a bar or rod of the metal is placed in the zone in which at least a portion of the catalyst system is prepared, or in which the polymerization is carried out, and cut by a cutting blade. By the action of this cutting blade, small particles of the metal are continuously removed and freshly cut surfaces are exposed to the other reactants. This action creates high localized temperature and pressure conditions and promotes reactions which are otherwise difficult to initiate. Apparatus suitable for use in the preparation of the catalyst systems of this invention is described in Shaw 2,416,717.

The metals and alloys of metals which are employed in my invention are machinable metals or alloys, i.e., they can be cut but are not brittle and will not shatter or crumble under the operating conditions. These include the normally solid metals as well as alloys which are normally solid of the metals of groups I-A, II and III-B of the periodic system. More particularly, these metals include sodium, potassium, lithium, cesium, rubidium, magnesium, beryllium, zinc, cadmium, gallium, indium, thallium, and aluminum. Alloys can be used. This method is particularly advantageous when using metals or alloys which are relatively high melting and which have a tendency to form on their surfaces tightly adhering oxides, for example, aluminum and magnesium and their alloys. While the relatively low melting metals such as sodium and potassium can be employed in my process, these are not nearly so difficult to obtain in a highly active, finely dispersed form as are aluminum and magnesium.

The catalyst employed in the process of this invention comprises in addition to the finely divided metal at least one second component selected from the following:

(1) Halides of titanium, zirconium, iridium, vanadium, molybdenum, tungsten, tellurium, selenium, and polonium, complex salts of said halides with an alkali metal halide, and complex salts of said halides with an ammonium halide.

(2) A compound of (1) and an organic halide.

(3) The oxides, oxyhalides, and hydrides of titanium, zirconium, hafnium, thorium, germanium, cerium, tin, and lead in combination with an organic halide.

(4) Molybdenum oxide and alkali metal molybdates.

(5) A compound of (4) and an organic halide.

(6) Oxyhalides, hydroxyhalides, oxyhydroxyhalides of molybdenum, tungsten, selenium, tellurium, and polonium, complex salts thereof with an alkali metal halide, and complex salts thereof with an ammonium halide.

(7) A compound of (6) and an organic halide.

(8) The oxides and oxyhalides of vanadium.

(9) A compound of (8) and an organic halide.

(10) Cromyl halides and an organic halide.

(11) An organic halide and a group IV-A metal derivative selected from the group consisting of salts of monobasic organic acids and a group IV-A metal, complex salts of dibasic organic acids, and at least one group IV-A metal, and at least one member selected from the group consisting of alkali metals and ammonia, complex compounds of a group IV-A metal corresponding to the formula $X_nM(OR)_m$, and complex compounds of a group IV-A metal corresponding to the formula $M_a[(OCH_2CH_2)_aNH_{(3-a)}]_b$ wherein X is a halogen, M is selected from the group titanium, zirconium, hafnium, and thorium, $m$ and $n$ are whole numbers with $m$ being at least 1 and not greater than the valence of the metal and with the sum of $m$ and $n$ being equal to the valence of M, and wherein $a$ is an integer from 1 to 3, inclusive, and $b$ is equal to the valence of M, and R is selected from the group consisting of R" and R"', where R" is selected from the the group consisting of saturated acyclic, monoolefinic acyclic, saturated cyclic, monoolefinic cyclic, aromatic, and combinations of two or more of these radicals and R"' is selected from the group consisting of R" radicals which are halogen-substituted, R" radicals which contain oxygen, and R" radicals which are halogen-substituted and contain oxygen, said oxygen being present in the form of an ether linkage.

Examples of such catalyst systems include aluminum and titanium tetrachloride; magnesium and titanium tetrachloride; sodium and titanium tetrachloride; magnesium, ethyl bromide, and titanium tetrachloride; aluminum-magnesium alloy, ethyl bromide, and titanium tetrachloride; aluminum, aluminum chloride, and titanium butoxide; aluminum, aluminum chloride, and $$K_2TiO(C_2O_4)_2 2H_2O$$

sodium, aluminum chloride, and titanium butoxide; sodium and zirconium tetrachloride; aluminum, ethyl bromide, and titanium butoxide; sodium, chlorobenzene, and titanium tetrachloride; magnesium, titanium dioxide and ethyl bromide; zinc and molybdenum oxide; cadmium, sodium molybdate and amyl chloride; beryllium and vanadium oxymonochloride; aluminum, molybdenum oxybromide and butyl bromide; aluminum, ethyl chloride, and chromyl chloride; magnesium, ethyl chloride, and $K_2TiCl_6$; gallium and tellurium oxide; and indium, vanadium oxytrichloride and propyl bromide.

As stated above, I sometimes employ in the catalyst system an organic chloride, bromide, fluoride or iodide having at least one carbon atom having a hydrogen atom thereon. These organic halides can be mono-, di-, tri- or tetra-substituted halides and those which are preferred contain from 1 to 8 carbon atoms per molecule. Examples of such halides include chlorobenzene, bromobenzene, ethyl bromobenzene, ethyl chloride, ethyl bromide, ethyl iodide, propyl chloride, butyl iodide, butyl fluoride, 1,2-dibromoethane, 1,3-dibromopropane, 1,2,3-tribromopropane, 1,2,3-trichloropropane, 1,4-diiodobutane, 1,3-dichlorocyclohexane, benzyl chloride, 2-chlorooctane, cyclopentyl chloride, 1-chloro-3-phenyl propane, and cyclohexyl chloride.

It is preferred in some cases, to carry out the reaction in the presence of a diluent which is relatively inert under the reaction conditions and ordinarily the reaction is effected at a pressure sufficient to maintain the diluent in the liquid phase. Suitable diluents for use in the polymerization process are paraffins, cycloparaffins, and/or aromatic hydrocarbons. Examples of these materials include butane, pentane, isooctane, cyclohexane, methylcyclohexane, benzene, toluene, and xylene.

Materials which are polymerized in accordance with this invention are, broadly, polymerizable hydrocarbons and preferably olefins containing a $CH_2=C<$ group. Of these olefinic hydrocarbons, those most generally preferred are the 1-olefins containing from 2 to 8 carbon atoms per molecule. Examples of compounds that can be polymerized in this process include ethylene, propylene, 1-butene, 1-heptene, 1-hexane, and 1-octene. Branched chain olefins such as isobutylene can also be used. 1,1-dialkyl-substituted and 1,2-dialkyl-substituted ethylenes are also considered applicable. Examples of the di- and polyolefins in which the double bonds are in non-conjugated positions and which can be used in accordance with this invention are 1,5-hexadiene, 1,4-pentadiene, and 1,4,7-octatriene. Cyclic olefins such as cyclohexene can also be used. Mixtures of the foregoing polymerizable hydrocarbons can be polymerized as, for example, ethylene and propylene, ethylene and 1-butene, propylene and 1-butene, etc. It is also possible to polymerize material such as styrene, alkyl-substituted styrenes, and the like in accordance with the present process. This invention is also applicable to the polymerization of a monomeric material comprising conjugated dienes containing from 4 to 8, inclusive, carbon atoms. Examples of conjugated dienes which can be used include 1,3-butadiene, 2-methyl-1,3-butadiene, 2,3-dimethyl-1,3-butadiene, 2-methyl-1,3-pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene, and the like. It is within the scope of the invention to polymerize such conjugated dienes either alone or in admixture with each other and/or with one or more other compounds containing an active $CH_2=C<$ group which are copolymerizable therewith. Included among these latter compounds are monoolefins such as those described hereinabove. Other examples of compounds containing an active $CH_2=C<$ group which are copolymerizable with one or more conjugated dienes are styrene, acrylonitrile, methacrylonitrile, methyl acrylate, methyl methacrylate, vinyl acetate, vinyl chloride, 2-methyl-5-vinylpyridine, 2-vinylpyridine, 4-vinylpyridine, etc.

The amount of catayst composition employed can vary over a wide range. The concentration of the total catalyst composition is usually in the range from 0.01 to 1.0 weight percent, or higher, based on the olefin present. This is composed of 0.02 to 50 mols of metal per mol of second component set forth above.

Temperatures can be varied over a broad range and may be in the range between —100° F. and 500° F. Temperatures in the range between 0 and 350° F. are most generally preferred.

Although pressures ranging from atmospheric up to 20,000 or 30,000 p.s.i.g., or higher, can be employed, pressures in the range from 100 to 1,500 p.s.i.g. are generally considered preferable for most purposes.

Various operating procedures can be employed when polymerizing olefins by the mechanical activation process of my invention. In one method, a mixture of the metal and the organic halide is formed in one chamber and this mixture is subsequently introduced into a second chamber simultaneously with the metal halide, olefin, and diluent. The reaction between the organic halide and the metal can be partially effected in the first zone but at least 50 percent of the metal should be supplied to the polymerization zone in the unreacted condition. Control of metal thickness and temperature to ensure this amount of unreacted metal is determined by simple experiment for each combination. Polymerization occurs in the second reaction zone. This method is illustrated in Figure 1 of the drawing. In this figure the mechanical activation chamber is indicated generally by the numeral 10. This apparatus is more fully described in the Shaw patent previously mentioned. The apparatus comprises a chamber 11 into which rod 12 is driven by suitable means (not shown). A shaft 13 carries cutting element or cutter 14, having cutting face 16. In order to provide for operation at elevated temperatures, a condenser 17 is provided communicating with chamber 11 by means of conduit 18. In order to prevent the introduction of air into the catalyst system, means is provided to purge the system with an inert gas, such as nitrogen, this means including an inert gas supply source 19 and conduit 21 connecting said source with chamber 11. In this modification the organic halide is introduced into chamber 11 by means of conduit 22. In the operation, the organic halide is introduced in sufficient amount to cover the lower end of bar or rod 12 and the shaft 13 is rotated so that pieces are cut from the lower end of this rod while it is below the surface of the liquid level maintained therein. The cutter is preferably operated to provide cutting speeds of 20 to 300 feet per minute. Controlled by means of regulator valve 27, the metal and organic halide mixture is passed by means of conduit 28 to polymerization zone 29, this zone being provided with agitation means 31. In this modification the polymerization zone 29 is also provided with inlet conduits 32, 33 and 34, these providing for introduction of diluent, monomer, and metal halide, respectively. Polymerization is carried out in this polymerization zone and the polymerization zone effluent is passed to catalyst deactivation zone 36 by means of conduit 37. A material which will deactivate the catalyst, such as an alcohol, is introduced into zone 36 by means of conduit 38. Zone 36 is also provided with agitation means 39 for good contacting of the polymerization zone effluent and the catalyst deactivation material. Recovery of the polymer can be carried out by means of a variety of systems and I have illustrated one suitable method in order to provide a complete disclosure of my process. This involves introduction of the polymer slurry into dilution zone 41 by means of conduit 42, dilution zone 41 being provided with agitation means 43 and diluent supply conduit 44. Following dilution, the polymer slurry is passed separation zone 46 by means of conduit 47. According to one method of operation, the polymer is recovered by filtration in zone 46 and is obtained in conduit 48, the balance of the material appearing in conduit 49. Other methods of polymer recovery can, of course, be used.

This process can be operated batchwise but is more conveniently operated continuously, this involving continuously feeding the organic halide to zone 10 and continuously feeding bar or rod 12 to the cutter 14. The resulting mixture is then passed continuously to polymerization zone 29.

In an alternative method, the metal provided continuously in a finely divided form is introduced into the reaction chamber simultaneously with a metal halide, an olefin, and a diluent for the reaction. As stated, an organic halide can be introduced into the reaction chamber, if desired, in addition to the other ingredients. In this case the high localized temperature and pressure conditions created at the freshly exposed metal surface promote the reaction. This modification is illustrated in Figure 2 of the drawing, like elements being indicated with the same numerals used in Figure 1. As shown in Figure 1, the metal rod 12 extends into zone 11 and is contacted by cutter 14. Conduit 22 supplies the organic halide, if desired, and conduit 23 is provided for introduction of the metal halide into the reaction chamber. The monomer and diluent are introduced into the reaction chamber by means of conduits 34 and 36, respectively. In this modification, conduit 28 extends directly to catalyst deactivation chamber 36 and the polymer is recovered in the same manner as that shown in Figure 1.

The process of this invention is usually operated continuously with the various reactants being maintained in the reactor at the specified concentrations for a suitable residence time. The residence time can vary widely since it depends to a great extent upon the temperature employed and also on the olefin being polymerized. The residence time for the polymerization of an aliphatic monoolefin generally falls within the range of 1 second to an hour or more when the temperature is in the range between 200 and 300° F.

After the reaction mixture is withdrawn from the reaction zone, it is treated with a catalyst-inactivating material such as an alcohol. However, aliphatic alcohols such as methyl, ethyl, propyl, and butyl alcohols, are preferred. The diluent and alcohol are separated from the polymer, which is then dried.

*Example I*

A reactor suitable for polymerization of olefins by the mechanical activation process is flushed with dry nitrogen and heated to approximately the boiling point of ethyl chloride. The reactor is provided with a suitable condensing apparatus to prevent loss of ethyl chloride by evaporation. An aluminum rod is inserted in the bushing provided and clamped in the arm of the feeding mechanism. Ethyl chloride is introduced, the liquid level being maintained such that it will cover the surface of the metal being cut. The feed mechanism is started to feed the aluminum rod at a rate sufficient to produce chips in the desired thickness. When the ratio of organic halide has reached 15 mols per mol of metal, the mixture containing 60% of the metal cut as free metal is fed into a second zone where titanium tetrachloride, ethylene and benzene are introduced simultaneously. The process is operated continuously with the concentration of titanium tetrachloride being adjusted so that 0.5 mol of the metal per mol of titanium tetrachloride is present. The ethylene feed rate is adjusted so that the total catalyst concentration is maintained at approximately 0.5 weight percent, based on the ethylene. The quantity of benzene is regulated so that the slurry withdrawn from the reaction zone contains approximately 10 weight percent of polymer. The reaction pressure is maintained at 650 p.s.i.g. and the temperature at 200° F. The polymer slurry is treated with isopropyl alcohol to deactivate the catalyst. The suspension of the polymer in the mixture of benzene and isopropyl alcohol is diluted with methanol and the polymer is recovered by filtration.

*Example II*

A reactor of the type employed for the polymerization of olefins by the mechanical activation process provided with a condensing apparatus, is flushed with nitrogen. A magnesium rod is inserted in the bushing and clamped in the arm of the feeding mechanism. Ethyl bromide, titanium tetrachloride, ethylene and cyclohexane are introduced simultaneously, the liquid level being maintained such that it will at least touch the metal rod. The feed mechanism is adjusted to feed the magnesium rod at a rate sufficient to produce chips of the desired thickness. The quantity of ethyl bromide is regulated at 1.5 mols per mol of titanium tetrachloride and the quantity of magnesium is regulated at one mol per mol of titanium tetrachloride. Ethylene is introduced at a rate such that the total catalyst concentration is maintained at 0.6 weight percent, based on the ethylene. Temperature of the polymerization ranges from 225 to 250° F., and pressure is regulated at 500 p.s.i.g. The amount of cyclohexane employed is sufficient to give approximately 8 weight percent of polymer in the slurry withdrawn from the reactor. Recovery of the product is accomplished in the manner described in Example I.

*Example III*

A magnesium rod is inserted in a reactor of the type used in the preceding examples and is clamped in the arm of the feed mechanism. Titanium tetrachloride, benzene, and ethylene are introduced simultaneously into the reactor. Throughout the reaction the quantity of magnesium is regulated at 0.8 to 1 mol per mol of titanium tetrachloride and the amount of catalyst, based on the ethylene, is maintained at 0.3 to 0.5 weight percent. The temperature is controlled at 225 to 250° F. and the pressure at 500 to 550 p.s.i.g. The amount of benzene employed is sufficient to give approximately 10 weight percent of polymer in the slurry withdrawn from the reactor. Recovery of the product is accomplished in the manner described in Example I.

As many possible embodiments may be made of this invention without departing from the scope thereof, it is to be understood that all matter herein set forth or shown in the accompanying drawings is to be interpreted as illustrative and not in a limiting sense.

I claim:

1. In a process for the polymerization of monomers containing a $CH_2=C<$ group with a catalyst comprising (1) an elemental metal selected from the group consisting of sodium, potassium, lithium, cesium, rubidium, magnesium, beryllium, zinc, cadmium, gallium, indium, thallium, aluminum, and alloys thereof, and (2) a compound of a metal selected from the group consisting of titanium, zirconium, iridium, vanadium, molybdenum, tungsten, tellurium, selenium, polonium, hafnium, thorium, germanium, cerium, tin, lead and chromium, in the presence of a hydrocarbon diluent, which is inert under conditions of the process, the improvement which comprises introducing said compound of a metal, said monomer and said hydrocarbon diluent into a polymerization zone; introducing a solid body of said elemental metal into said zone, at least one surface of said solid body of said metal being below the surface of reaction mixture in said zone; and continuously cutting chips from the surface of said body of metal below the surface of said reaction mixture.

2. The process of claim 1 wherein said catalyst comprises titanium tetrachloride and magnesium.

3. The process of claim 1 wherein said catalyst comprises ethyl chloride, titanium tetrachloride, and aluminum.

4. The process of claim 1 wherein said catalyst comprises ethyl bromide, titanium tetrachloride, and magnesium.

5. The process of claim 1 wherein said catalyst comprises ethyl bromide, titanium tetrachloride, and aluminum.

6. The process of claim 1 wherein said catalyst comprises aluminum, ethyl chloride, and chromyl chloride.

7. The process of claim 1 wherein said catalyst comprises aluminum and $Ti(OC_4H_9)_4$.

8. In a process for the polymerization of ethylene with a catalyst comprising aluminum and titanium tetrachloride in the presence of a hydrocarbon diluent, which is inert under conditions of the process, the improvement which comprises introducing titanium tetrachloride, ethylene and said hydrocarbon diluent into a polymerization zone; introducing a solid body of aluminum into said zone, at least one surface of said aluminum being below the surface of the reaction mixture in said zone; continuously cutting chips from the surface of said body below the surface of the reaction mixture; and recovering a solid polymer of ethylene.

9. A process for the polymerization of ethylene in the presence of benzene and a catalyst system comprising ethyl chloride, aluminum, and titanium tetrachloride, comprising introducing ethyl chloride into a first zone; introducing a solid body of aluminum into said first zone, at least one surface of said solid body of aluminum being below the surface of said ethyl chloride; continuously cutting chips from the surface of said body below the surface of said ethyl chloride; reacting aluminum with ethyl chloride in said first zone so that at least 50 percent of said aluminum remains in an unreacted condition; feeding the resulting reaction product and unreacted aluminum chips to a polymerization zone; feeding titanium tetrachloride, ethylene and benzene to said polymerization zone; removing polymer slurry from said polymerization zone; and recovering resulting polymer.

10. A process for the polymerization of ethylene in the presence of cyclohexane and a catalyst system comprising ethyl bromide, magnesium, and titanium tetrachloride, comprising introducing said ethyl bromide, titanium tetrachloride, ethylene and cyclohexane into said polymerization zone, introducing a solid body of magnesium into said zone, at least one surface of said solid body of magnesium being below the surface of the reaction mixture in said zone; continuously cutting chips from the surface of said body below the surface of the reaction mixture; removing polymer slurry from said polymerization zone; and recovering resulting polymer.

11. A process for the polymerization of ethylene in the presence of benzene and a catalyst system comprising magnesium and titanium tetrachloride, comprising introducing said titanium tetrachloride, ethylene, and benzene into a polymerization zone; introducing a solid body of magnesium into said zone, at least one surface of said magnesium being below the surface of the reaction mixture in said zone; continuously cutting chips from the surface of said body below the surface of the reaction mixtures; removing polymer slurry from said polymerization zone, and recovering resulting polymer.

12. A process for the polymerization of ethylene in the presence of benzene and a catalyst system comprising ethyl chloride, aluminum, and titanium tetrachloride comprising introducing said ethyl chloride, titanium tetrachloride, ethylene and benzene into said polymerization zone, introducing a solid body of aluminum into said zone, at least one surface being below the surface of the reaction mixture in said zone, continuously cutting chips from the surface of said body of aluminum below the surface of the reaction mixture; removing polymer slurry from said polymerization zone; and recovering the resulting polymer.

13. In a process for the polymerization of monomers containing a $CH_2=C<$ group with a catalyst comprising (1) an organic halide, (2) an elemental metal selected from the group consisting of sodium, potassium, lithium, cesium, rubidium, magnesium, beryllium, zinc, cadmium, gallium, indium, thallium, aluminum, and alloys thereof, and (3) a compound of a metal selected from the group consisting of titanium, zirconium, iridium, vanadium, molybdenum, tungsten, tellurium, selenium, polonium, hafnium, thorium, germanium, cerium, tin, lead and chromium, in the presence of a hydrocarbon diluent, which is inert under conditions of the process, the improvement which comprises introducing said organic halide into a first zone; introducing a solid body of said elemental metal into said first zone, at least one surface of said solid body of said metal being below the surface of said organic halide; continuously cutting chips from the surface of said solid body below the surface of said organic halide; reacting said elemental metal with said organic halide in said first zone so that at least 50 percent of said elemental metal remains in an unreacted condition; feeding the resulting reaction product and unreacted metal chips into a polymerization zone; feeding said compound of a metal, said monomer and said hydrocarbon diluent into said polymerization zone; removing polymer slurry from said polymerization zone; and recovering resulting polymer.

References Cited in the file of this patent

UNITED STATES PATENTS

| 2,181,640 | Deanesly et al. | Nov. 28, 1939 |
| 2,416,717 | Shaw | Mar. 4, 1947 |
| 2,721,189 | Anderson et al. | Oct. 18, 1955 |

FOREIGN PATENTS

| 534,792 | Belgium | Jan. 31, 1955 |
| 718,198 | Great Britain | Nov. 10, 1954 |